US005378818A

United States Patent [19]

Mayer et al.

[11] Patent Number: 5,378,818

[45] Date of Patent: Jan. 3, 1995

[54] DOUBLED AZO DYES

[75] Inventors: Udo Mayer, Frankenthal, Germany; Hans-Juergen Degen, Randolph, N.J.

[73] Assignee: BASF Aktiengesellschaft, Ludwigshafen, Germany

[21] Appl. No.: 158,265

[22] Filed: Nov. 29, 1993

[30] Foreign Application Priority Data

Dec. 5, 1992 [DE] Germany .......................... 4240981

[51] Int. Cl.[6] .................... C09B 31/12; C09B 67/22; D21H 21/28

[52] U.S. Cl. .................................... 534/758; 8/641; 8/919; 162/162

[58] Field of Search .................. 534/758; 8/641, 919; 162/162

[56] References Cited

U.S. PATENT DOCUMENTS

| | | | |
|---|---|---|---|
| 1,606,209 | 11/1929 | De Montmollin | 534/758 X |
| 3,415,808 | 12/1968 | Weber et al. | 534/758 X |
| 3,788,802 | 1/1974 | Litke | 162/162 |
| 4,071,312 | 1/1978 | Blackwell | 8/648 |
| 4,877,412 | 10/1989 | Pedrazzi | 8/437 |
| 5,173,086 | 12/1992 | Bermes | 8/527 |
| 5,295,999 | 3/1994 | Hinrichs et al. | 8/641 |

FOREIGN PATENT DOCUMENTS

| | | |
|---|---|---|
| 0479056A2 | 4/1992 | European Pat. Off. . |
| 3434921 | 5/1986 | Germany . |
| 560241 | 3/1975 | Switzerland . |

*Primary Examiner*—Mary C. Lee

*Assistant Examiner*—Fiona T. Powers

*Attorney, Agent, or Firm*—Oblon, Spivak, McClelland, Maier & Neustadt

[57] ABSTRACT

There are described azo dyes of the formula

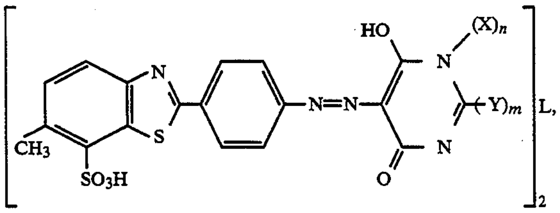

where in case a)

m is 1, n is 0,

Y is hydroxyl, and

L is $C_1$–$C_6$-alkylene, or in case b)

m is 0 or 1, n is 1,

X is hydrogen,

Y is imino, and

L is 1,4-piperazinediyl when m is 0 or $C_2$–$C_6$-alkylene or phenylene when m is 1, the use thereof for dyeing or printing paper stock, and dye mixtures comprising the dyes.

6 Claims, No Drawings

DOUBLED AZO DYES

The present invention relates to novel azo dyes of the formula I (I)

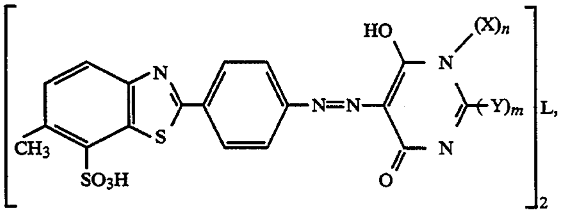

where in case a)

m is 1, n is 0,

Y is hydroxyl, and

L is $C_1$–$C_6$-alkylene, or in case b)

m is 0 or 1, n is 1,

X is hydrogen,

Y is imino, and

L is 1,4-piperazinediyl when m is 0 or $C_2$–$C_6$-alkylene or phenylene when m is 1, to the use thereof for dyeing or printing paper stock, and to dye mixtures comprising the novel dyes.

U.S. Pat. No. 4,071,312 discloses the dye of the formula II

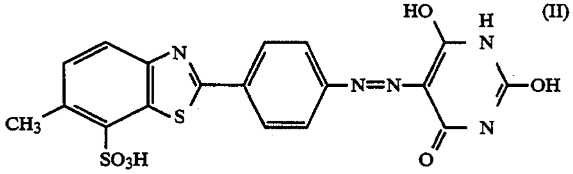

(II)

which because of its brilliant yellow color is preferably used for dyeing paper stock. However, this dye has application defects in that it dyes the wire side (lower surface) of the paper preferentially, i.e. distinctly deeper than the upper surface.

It is an object of the present invention to make available novel dyes for advantageous dyeing or printing of paper stock. The novel dyes shall dye the paper preferentially not on the wire side but on the upper side.

We have found that this object is achieved by the above-defined doubled azo dyes of the formula I.

The novel azo dyes of the formula I are each indicated in the form of the free acid. It will be readily understood that their salts are encompassed by the claims, too.

Suitable cations are derived from metal or ammonium ions. Metal ions are in particular the lithium, sodium or potassium ions. Ammonium ions for the purposes of the present invention are substituted or unsubstituted ammonium cations. Substituted ammonium cations are for example monoalkyl-, dialkyl-, trialkyl-, tetraalkyl- or benzyltrialkyl-ammonium cations or cations which are derived from nitrogen-containing five- or six-membered saturated heterocycles, such as pyrrolidinium, piperidinium, morpholinium, piperazinium or N-alkylpiperazinium cations or their N-monoalkyl- or N,N-dialkyl-substituted products. Alkyl is in general to be understood as meaning straight-chain or branched $C_1$–$C_{20}$-alkyl, which may be substituted by hydroxyl and/or interrupted by oxygen atoms in ether function.

Particularly suitable cations are lithium, sodium, potassium, N,N-dimethylethanolammonium or N,N-diethylethanolammonium ions.

Any alkylene appearing in the formula I may be straight-chain or branched.

Suitable L is for example $CH_2$, $(CH_2)_2$, $(CH_2)_3$, $(CH_2)_4$, $(CH_2)_5$, $(CH_2)_6$, $CH(CH_3)CH_2$ or $CH(CH_3)CH(CH_3)$.

The azo dyes of the formula I can exist in various tautomeric forms, for example

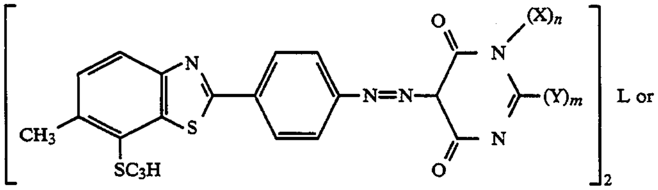

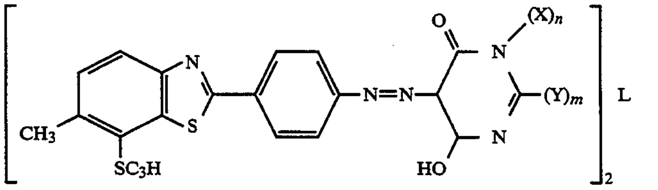

which are all encompassed by the claims.

Preference is given to azo dyes of the formula I in which m is 1 and n is 0.

Preference is further given to azo dyes of the formula I in which m is 0, n is 1 and L is 1,4-piperazinediyl.

Particular preference is given to dyes of the formula I in which m is 1, n is 0 and L is $C_4$–$C_6$-alkylene, in particular $C_4$- or $C_6$-alkylene.

The dyes of the invention are obtainable in a conventional manner.

For example, the diazonium salt of 2-(4-aminophenyl)-6-methylbenzothiazole-7-sulfonic acid can be coupled with barbituric acid derivatives of the formula III

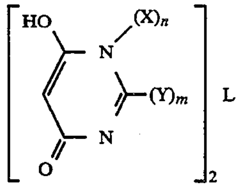

(III)

where m, n, L, X and Y are each as defined above.

The barbituric acid derivatives III are likewise preparable in a conventional manner as exemplified below in the Examples.

The azo dyes of the formula I according to the invention are advantageous for dyeing or printing paper in the stock in a conventional manner. They are preferably employed in processes for dyeing or printing paper in the pulp and for surface dyeing. The paper can be of any kind, in particular bleached, sized or unsized lignin-free paper based on bleached or unbleached pulp.

The novel azo dyes of the formula I dye the paper preferentially on the upper surface; that is, the upper surface is dyed to a deeper shade than the lower (wire side) surface.

It is a further object of the present invention to make available colorants for a uniform dyeing of the upper and lower surfaces of paper stock.

We have found that this object is achieved by dye mixtures comprising an azo dye of the formula I and the dye of the formula II

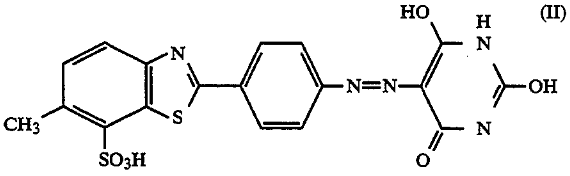

(II)

The novel dye mixtures are advantageous for dyeing or printing paper stock. They dye paper stock uniformly on the upper and lower surfaces.

The novel mixtures generally contain the dyes I and II in a weight ratio of from 1:4 to 4:1.

The Examples illustrate the invention.

EXAMPLE 1 a) A solution of 232 g of 1,6-diaminohexane in 500 ml of water was admixed with 480 g of urea at 60°-70° C. The mixture was heated and kept at the boil for 3 hours, in the course of which ammonia was released and a crystalline precipitate was formed. The mixture was diluted with 500 ml of water and adjusted with concentrated hydrochloric acid to pH 3. The still hot reaction mixture was discharged into 3000 g of ice-water. The precipitate was filtered off with suction, washed with water and dried at 70° C., leaving 347 g of hexamethyleneurea of the formula $$H_2N—CO—NH—(CH_2)_6—NH—CO—NH_2$$

(mp.: 200°-201° C.)

b) A mixture of 40.4 g of hexamethyleneurea (Example 1a) and 100 ml of N,N-dimethylformamide were admixed with 80 g of a 30% by weight sodium methoxide solution in methanol. The mixture was heated to 60° C. and 58.7 g of dimethyl malonate were added. The temperature was raised over about 15 minutes to 110° C. while methanol was distilled off. The precipitate dissolved. After the mixture had been stirred at 110° C. for a further 3 hours, the elimination of methanol ceased and the sodium salt of hexamethylenebarbituric acid crystallized out. 300 ml of water were added to redissolve the precipitate and the solution was adjusted to pH 2-2.5 with hydrochloric acid, which brought down the hexamethylenebarbituric acid in well formed crystals. After cooling down to room temperature, the product was filtered off with suction, washed with water and dried at 70° C., leaving 46 g of the compound of the formula

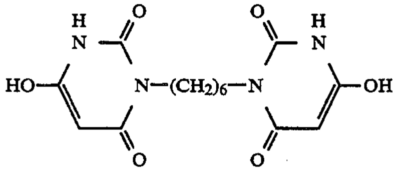

(mp.: 224°-228° C.).

c) 128 g of 2-(4-aminophenyl)-6-methylbenzothiazole-7-sulfonic acid were dissolved in 1500 ml of water using 32 g of 50% strength by weight sodium hydroxide solution and admixed with 120 g of 23% strength by weight aqueous sodium nitrite solution. The resulting solution was added over an hour to a mixture of 1500 ml of water, 700 g of ice and 160 ml of concentrated hydrochloric acid. A precipitate formed. After further stirring at 0°-5° C. for 1.5 hours the precipitate was filtered off with suction, washed with water and dried at 60° C., leaving 122 g of the compound of the formula

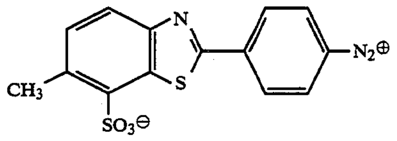

d) 16.6 g of the diazonium salt described under c) were added at 0°-5° C. to a suspension of 8.5 g of hexamethylenebarbituric acid (Example 1b) in 119 ml of water. After stirring for 2 hours 21 g of N,N-diethylethanolamine were added. The resulting dye of the formula (in the form of the free acid)

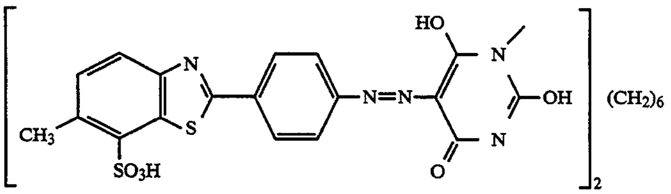

dissolved. The liquid dye was filtered and after that its storage stability was good. It absorbs at 412 nm and exhausts virtually completely even onto lignin-free paper, the upper surface being dyed more deeply than the lower surface.

The method of Example 1 also produced the dyes of the formula

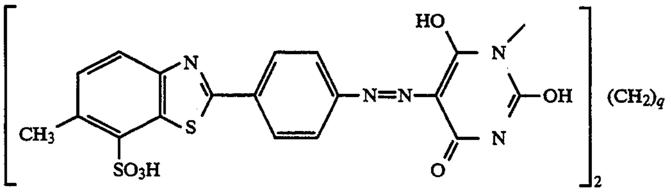

listed below in Table 1.

TABLE 1

| Example No. | q | $\lambda_{max}$ [nm] | Affinity for lignin-free paper | Surface dyed preferentially |
|---|---|---|---|---|
| 2 | 3 | 410 | good | upper |
| 3 | 4 | 410 | very good | upper |
| 4 | 5 | 412 | very good | upper |

EXAMPLE 5 a) A mixture of 106 g of piperazine hydrochloride and 60 g of a 24% strength by weight aqueous cyanamide solution was heated to 115° C. At that temperature a further 192 g of cyanamide solution were added over an hour. After 8 hours the mixture was cooled down to room temperature, and the precipitate was filtered off with suction and washed with a little ethanol. After the hydrochloride formed had been dissolved in weakly ammoniacal water, the amidine base was precipitated using 50% strenth by weight sodium hydroxide solution. Isolating and drying left 68 g of the compound of the formula

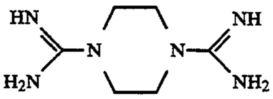

(mp.: 213°-216° C.)

A mixture of 12.5 g of the amidine described under a), 36 g of 30% strength by weight sodium methoxide solution in ethanol and 16 g of methyl malonate was refluxed in 80 g of ethanol for 4 hours. After cooling down to room temperature, the precipitated product was filtered off with suction and washed with 50 ml of methanol. A solution thereof in 100 ml of water was adjusted with hydrochloric acid to pH 2, which brought down the product of the formula

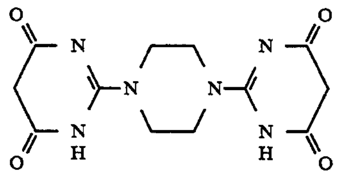

as crystals. It was isolated, washed with water and dried at 70° C. The yield was 9 g.

6.4 g of 2-(4-aminophenyl)-6-methylbenzothiazole-7-sulfonic acid were introduced into a mixture of 7 g of concentrated hydrochloric acid and 75 ml of water. After stirring at 0°-5° C. for 2 hours, 6.2 g of 23% strength by weight aqueous sodium nitrite solution were added, and after a further hour the excess of nitrous acid was destroyed with amidosulfuric acid. The mixture obtained was slowly added to solution of 3.1 g of amidine (Example 5b) and 2.5 g of 50% strength by weight sodium hydroxide solution in 50 ml of water and the resulting mixture was brought to pH 7 with about 6 g of 10% strength by weight sodium hydroxide solution. After stirring at room temperature for 18 hours, the precipitate formed was filtered off with suction, washed with a little ice-cold water and dried at 70° C. The yield was 8.6 g of the dye of the formula

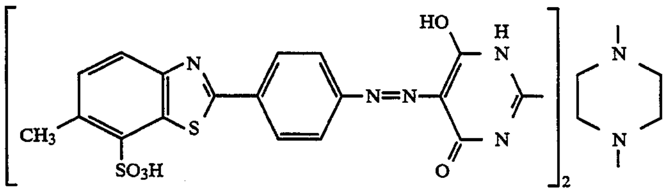

The dye produces yellow dyeings on paper. The affinity is very good even for lignin-free paper. The upper surface of the paper is dyed more deeply than the lower surface.

. The method of Example 5 also gives the dyes of the formula

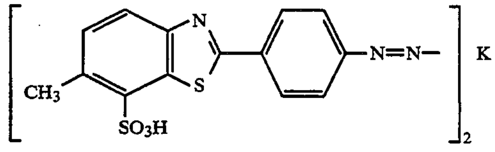

listed below in Table 2.

TABLE 2

| Example No. | K |
|---|---|
| 6 | 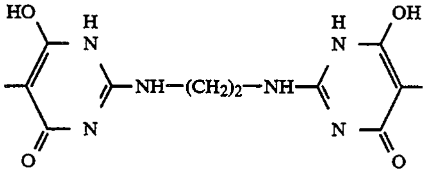 |
| 7 | 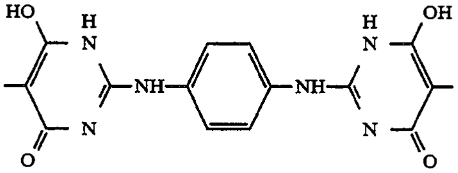 |

The dyes are likewise yellow and have high affinity for paper stock.

EXAMPLE 8

An aqueous suspension of 70 g of bleached pine sulfate pulp and 30 g of bleached birch sulfate pulp ground to a freeness of 30° SR and having a density of 2.5% by weight was admixed with 1.14 g of the liquid dye of Example 1d in the form of a 0.5% strength by weight aqueous solution acidified with acetic acid, and stirred for 15 minutes until homogeneous. The pulp was then diluted with tap water to a density of 0.2% by weight and used in a conventional manner in a sheet former to produce a sheet of paper. The waste water was virtually colorless. The yellow sheet of paper obtained was 14% deeper in shade on the upper surface than on the lower surface.

EXAMPLE 9

Example 8 was repeated with the dye of the formula

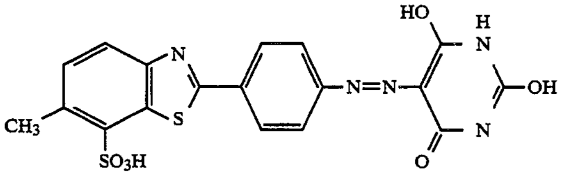

The liquid dye was prepared as described in Example 1 of EP-A-479 056. 0.94 g of this liquid brand produced a yellow sheet of paper with a 20% deeper shade on the lower surface than on the upper surface.

EXAMPLE 10

Example 8 was repeated with 0.56 g of the dye of Example 1d combined with 0.47 g of Example 1 of EP-A-479 056. The waste water was virtually colorless and the yellow sheet of paper had the same depth of shade on the upper and the lower surface.

We claim:

1. An azo dye of the formula I (I)

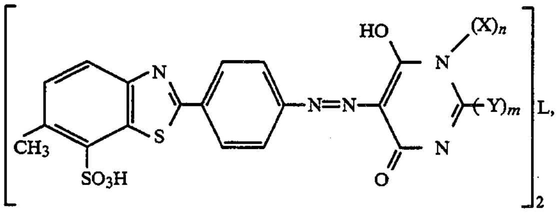

where
in case a)
m is 1,
n is 0,
Y is hydroxyl, and
L is $C_1$-$C_6$-alkylene, or
in case b)
m is 0 or 1,
n is 1,
X is hydrogen,
Y is imino, and
L is 1,4-piperazinediyl when m is 0 or $C_2$-$C_6$-alkylene or phenylene when m is 1.

2. An azo dye as claimed in claim 1, wherein m is 1 and n is 0.

3. An azo dye as claimed in claim 1, wherein m is 0, n is 1 and L is 1,4-piperazinediyl.

4. An azo dye as claimed in claim 1, wherein m is 1, n is 0 and L is $C_4$-$C_6$-alkylene.

5. A dye mixture comprising a dye of the formula I as set forth in claim 1 and the dye of the formula II (II)

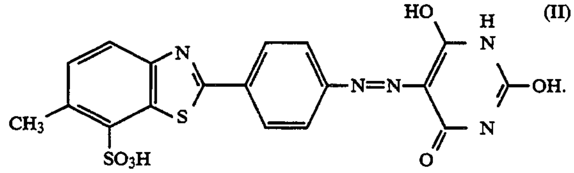

6. A process of dyeing or printing paper stock comprising applying thereto or incorporating in the paper pulp a dye of claim 1.

* * * * *